US012570790B2

(12) United States Patent
Hashiguchi

(10) Patent No.: US 12,570,790 B2
(45) Date of Patent: Mar. 10, 2026

(54) BIODEGRADABLE POLYESTER SOLUTION AND USE THEREOF

(71) Applicant: KANEKA CORPORATION, Osaka (JP)

(72) Inventor: Tomoaki Hashiguchi, Settsu (JP)

(73) Assignee: KANEKA CORPORATION, Osaka (JP)

( * ) Notice: Subject to any disclaimer, the term of this patent is extended or adjusted under 35 U.S.C. 154(b) by 862 days.

(21) Appl. No.: 17/759,544

(22) PCT Filed: Jan. 14, 2021

(86) PCT No.: PCT/JP2021/001022
§ 371 (c)(1),
(2) Date: Jul. 27, 2022

(87) PCT Pub. No.: WO2021/153250
PCT Pub. Date: Aug. 5, 2021

(65) Prior Publication Data
US 2023/0091624 A1 Mar. 23, 2023

(30) Foreign Application Priority Data
Jan. 29, 2020 (JP) ................................. 2020-012977

(51) Int. Cl.
*C08G 63/06* (2006.01)
*C09D 11/104* (2014.01)
*C09J 167/04* (2006.01)

(52) U.S. Cl.
CPC ............ *C08G 63/06* (2013.01); *C09D 11/104* (2013.01); *C09J 167/04* (2013.01)

(58) Field of Classification Search
CPC .... C08G 63/06; C09D 11/104; C09D 11/037; C09D 167/04; C09J 167/04; C08L 101/16
See application file for complete search history.

(56) References Cited

U.S. PATENT DOCUMENTS

| | | | |
|---|---|---|---|
| 8,283,435 B2 | 10/2012 | Whitehouse | |
| 2006/0058501 A1 * | 3/2006 | Walsem ................. | C08G 63/89 528/480 |
| 2006/0258833 A1 | 11/2006 | Senda et al. | |

| | | | |
|---|---|---|---|
| 2017/0174958 A1 | 6/2017 | Yang et al. | |
| 2020/0340020 A1 | 10/2020 | Arikawa et al. | |
| 2020/0384750 A1 | 12/2020 | Inagaki et al. | |

FOREIGN PATENT DOCUMENTS

| | | |
|---|---|---|
| CN | 108904888 A | 11/2018 |
| EP | 1 566 409 A1 | 8/2005 |
| JP | 2004-161802 A | 6/2004 |
| JP | 2008-29218 A | 2/2008 |
| JP | 2009-96849 A | 5/2009 |
| JP | 2009-120713 4 | 6/2009 |
| JP | 2013-185139 A | 9/2013 |
| JP | 2017-632404 A | 11/2017 |
| WO | WO 02/034857 A2 | 5/2002 |
| WO | WO 2019/142845 A1 | 7/2019 |
| WO | WO 2019/189745 A1 | 10/2019 |
| WO | WO 2019/239913 A1 | 12/2019 |

OTHER PUBLICATIONS

WO2019/142845A1 machine translation (Year: 2019).*
Combined Chinese Office Action and Search Report issued Jan. 12, 2024 in Chinese Patent Application No. 202180011515.x (with English translation), 19 pages.
International Search Report issued Mar. 23, 2021 in PCT/JP2021/ 001022 (with English translation), 4 pages.
Written Opinion of the International Searching Authority issued Mar. 23, 2021 in PCT/JP2021/001022 (with English translation), 6 pages.
Extended European Search Report issued Dec. 21, 2023, in corresponding European Patent Application No. 21747709.0, 7 pages.
Jia Jian et al: "Metabolic engineering for microbial production of polyhydroxyalkanoates consisting of high 3-hydroxyhexanoate content by recombinant Aeromonas hydrophila", Bioresource Technology, Elsevier, Amsterdam, NL, vol. 101, No. 15, Aug. 1, 2010, pp. 6096-6102, XP027018554, ISSN: 0960-8524.

* cited by examiner

*Primary Examiner* — Blaine Copenheaver
(74) *Attorney, Agent, or Firm* — Oblon, McClelland, Maier & Neustadt, L.L.P.

(57) ABSTRACT

An object of an embodiment of the present invention is to provide a biodegradable polyester solution that exhibits good solubility in a halogen-free organic solvent and that has sufficient adhesive strength even when aged for a short time. The object is achieved by providing a biodegradable polyester solution containing a poly(3-hydroxybutyrate-co-3-hydroxyhexanoate) copolymer and a solvent, the poly(3-hydroxybutyrate-co-3-hydroxyhexanoate) copolymer having an average content of 16 mol % or more 3-hydroxyhexanoate.

20 Claims, No Drawings

BIODEGRADABLE POLYESTER SOLUTION AND USE THEREOF

CROSS-REFERENCE TO RELATED APPLICATIONS

The present application is a 35 U.S.C. § 371 national stage patent application of International patent application PCT/JP2021/001022, filed on Jan. 14, 2021, which is based on and claims the benefits of priority to Japanese Application No. 2020-012977, filed on Jan. 29, 2020.

TECHNICAL FIELD

The present invention relates to a biodegradable polyester solution and use of the biodegradable polyester solution.

BACKGROUND ART

Petroleum-derived plastics are disposed of in large quantities every year, and a shortage of landfill sites and environmental pollution due to these large quantities of waste are taken up as serious problems. In recent years, microplastics derived from such waste as mentioned above have been a major problem in a marine environment.

A polyhydroxyalkanoate-based resin, which has excellent biodegradability in seawater, has attracted attention as a material that can solve environmental issues caused by discarded plastics. An adhesive, ink, a coating agent, or the like (also referred to as a "member for secondary processing") is sometimes used to carry out secondary processing with respect to a polyhydroxyalkanoate-based resin. From the viewpoint of such environmental issues as mentioned above, the member for secondary processing is also required to have biodegradability in seawater.

However, hardly any such members for secondary processing that have biodegradability in seawater have been provided so far.

Patent Literature 1 discloses, as an example of a member for secondary processing that has biodegradability in seawater, an adhesive composition in which a reactive monomer (e.g., an acrylate monomer) is reacted with a polyhydroxyalkanoate resin.

Patent Literature 2 discloses a technique for obtaining an adhesive by dissolving, in butyl acetate, poly(3-hydroxybutyrate-co-4-hydroxybutyrate) having a glass transition temperature Tg in a certain range.

CITATION LIST

Patent Literatures

Patent Literature 1

International Publication No. WO 2002/034857

Patent Literature 2

U.S. Pat. No. 8,283,435

SUMMARY OF INVENTION

Technical Problem

However, according to the adhesive composition of Patent Literature 1, during its decomposition in seawater, a reactive monomer unit flows out without being decomposed. This may cause marine environmental pollution.

Meanwhile, the adhesive of Patent Literature 2 needs to be aged for 24 hours or more so as to exhibit sufficient adhesion strength. This leaves room for practical improvement.

In view of the above. an object of the present invention is to provide a biodegradable polyester solution that exhibits good solubility in a halogen-free organic solvent and that has sufficient adhesive strength even when aged for a short time.

Solution to Problem

As a result of conducting diligent study in order to attain the object, the inventors of the present invention found for the first time that a poly(3-hydroxybutyrate-co hydroxyhexanoate) copolymer (hereinafter referred to as "PHBH") having an average content of 3-hydroxyhexanoate (hereinafter referred to as "3 HH") in a specific range has excellent solubility in a halogen-free organic solvent and that a biodegradable polyester solution that contains such a poly(3-hydroxybutyrate-co-3-hydroxyhexanoate) copolymer has sufficient adhesion strength even when aged for a short time. The inventors of the present invention thus arrived at the present invention.

Thus, an aspect of the present invention is a biodegradable polyester solution containing: a poly(3-hydroxybutyrate-co-3-hydroxyhexanoate) copolymer; and an organic solvent, the poly(3-hydroxybutyrate-co-3-hydroxyhexanoate) copolymer having an average content of 16 mol % or more 3-hydroxyhexanoate.

Advantageous Effects of Invention

An aspect of the present invention makes it possible to provide a biodegradable polyester solution that exhibits good solubility in a halogen-free organic solvent and that has sufficient adhesive strength even when aged for a short time.

DESCRIPTION OF EMBODIMENTS

The following description will discuss an embodiment of the present invention in detail. Note that any numerical range expressed as "A to B" in the present specification means "not less than A and not more than B" unless otherwise stated. All literatures listed herein are incorporated herein by reference.

[1. Overview of the Present Invention]

A biodegradable polyester solution in accordance with an embodiment of the present invention (hereinafter referred to as "the present biodegradable polyester solution") is a biodegradable polyester solution containing: a poly(3-hydroxybutyrate-co-3-hydroxyhexanoate) copolymer; and an organic solvent, the poly(3-hydroxybutyrate-co-3-hydroxyhexanoate) copolymer having an average content of 16 mol % or more 3-hydroxyhexanoate.

With attention paid to a PHBH as a resin having biodegradability in seawater, the inventors of the present invention studied a technique related to a polyester solution containing the PHBH. As a result, the inventors of the present invention found that a PHBH is commonly insoluble in an organic solvent but is slightly soluble in a halogen-based organic solvent such as chloroform. However, a halogen-based organic solvent is unfortunately harmful to human health in terms of a working environment.

In view of the above, as a result of conducting further study, the inventors of the present invention found for the first time that a polyester solution that contains a PHBH having an average content of 3 HH in a specific range has excellent solubility in a halogen-free organic solvent. It was also found that a resultant PHBH-containing solution has sufficient adhesion strength even when aged for a short time.

A biodegradable polyester solution that exhibits good solubility in a halogen-free organic solvent and that has sufficient adhesion strength even when aged for a short time was thus disclosed for the first time. The present invention is very useful when used in various fields. Note that examples of "good solubility" as used herein include a dissolved state that is very good (VG) or good (G) in a case where a degree of opacity of the biodegradable polyester solution is visually observed, as shown in Examples (described later). Note also that examples of "having sufficient adhesion strength even when aged for a short time" include having an adhesion strength of 0.1 N/15 mm or more in a peel strength test carried out in accordance with a method of JIS (Japanese Industrial Standards) Z 0238, as shown in Examples (described later).

[2. Biodegradable Polyester Solution]

(PHBH)

A PHBH is a copolymer including 3-hydroxybutyrate (also referred to as "3 HB") and 3 HH as repeating units.

In an embodiment of the present invention, a PHBH may be obtained by a method that is either a method of production from a microorganism or a chemical synthetic method and that is not particularly limited. In particular, a PHBH that is obtained by the method of production from a microorganism is preferable in terms of being fine particles.

A microorganism from which a PHBH is to be produced is not particularly limited provided that the microorganism can accumulate a PHBH in its cell. Examples of such a microorganism include bacteria belonging to *Alcaligenes* such as *Alcaligenes lipolytica*, *Alcaligenes eutrophus*, and *Alcaligenes latus*, *Pseudomonas*, *Bacillus*, *Azotobacter*, *Nocardia*, and *Aeromonas*. Above all, from the viewpoint of productivity of a PHBH, a strain such as *Aeromonas caviae* is particularly preferable, and an *Alcaligenes eutrophus* AC32 strain (accession number FERM BP-6038 (transferred from the original deposit (FERM P-15786) deposited on Aug. 12, 1996) (Aug. 7, 1997, International Patent Organism Depositary, National Institute of Advanced Industrial Science and Technology, address: AIST Tsukuba Central 6, 1-1-1 Higashi, Tsukuba, Ibaraki, Japan) (J. Bacteriol., 179, pp. 4821-4830 (1997)) into which a gene belonging to a PHA synthase group has been introduced is more preferable. Furthermore, a method for obtaining a PHBH from *Aeromonas caviae*, which is a microorganism belonging to *Aeromonas*, is disclosed in, for example, Japanese Patent Application Publication Tokukaihei No. 5-93049. Note that these microorganisms are used by being cultured under an appropriate condition so that a PHBH is accumulated in their bacterial cells.

A carbon source and a culture condition that are used for culture can be exemplified by but not limited to those employed in methods disclosed in, for example, Japanese Patent Application Publication Tokukaihei No. 5-93049 and Japanese Patent Application Publication Tokukai No. 2001-340078.

A microbially produced PHBH obtained by the above method is a random copolymer. A 3 HH content (composition) can be adjusted by, for example, selection of a bacterial cell, selection of a carbon source serving as a raw material, blending of PHBHs differing in 3 HH composition, and/or blending of 3 HB homopolymers. Examples of a method for adjusting the 3 HH content (composition) include a method in which a PHBH produced from a bacterial cell is used as it is, and a method in which PHBHs produced from a plurality of bacterial cells are mixed so that the PHBHs have an average content of 3 HH in a predetermined range of an aspect of the present invention.

An average content of 3 HH in a PHBH is 16 mol % or more, preferably 18 mol % or more, more preferably 20 mol % or more, and particularly preferably 22 mol % or more. The PHBH that has an average content of 16 mol % or more 3 HH brings about an effect of allowing the present biodegradable polyester solution to have good solubility in a halogen-free organic solvent. Furthermore, the average content of 3 HH in the PHBH has an upper limit that is not particularly limited but is preferably 80 mol % or less, more preferably 65 mol % or less, and particularly preferably 50 mol % or less. This is because the present biodegradable polyester solution that contains the PHBH having such an average content of 3 HH is easy to produce. Note that the average content of 3 HH in the PHBH is measured by a method described in Examples.

In an embodiment of the present invention, the PHBH contained in the present biodegradable polyester solution has a weight average molecular weight (g/mol) of, for example, 100,000 to 3,000,000, preferably 150,000 to 2,500,000, more preferably 200,000 to 2,300,000, and particularly preferably 300,000 to 2,100,000. The PHBH that has a weight average molecular weight of 50,000 or more brings about an effect of allowing the present biodegradable polyester solution to exhibit good adhesion strength. The PHBH that has a weight average molecular weight of 3,000,000 or less brings about an effect of allowing the present biodegradable polyester solution to be dissolved in a halogen-free organic solvent in a short time. Note that the weight average molecular weight of the PHBH contained in the present biodegradable polyester solution can be determined as a polystyrene equivalent molecular weight by gel permeation chromatography (GPC) ("Shodex GPC-101" manufactured by Showa Denko K.K.) by using polystyrene gel ("Shodex K-804" manufactured by Showa Denko K.K.) in a column and assuming that chloroform is a mobile phase.

(Organic Solvent)

In the present specification, an "organic solvent" is not particularly limited provided that the organic solvent can dissolve a PHBH well. Note, however, that in terms of a working environment, the organic solvent is preferably a halogen-free organic solvent because the halogen-free organic solvent causes few problems to human health. The halogen-free organic solvent is exemplified by, but not particularly limited to, ethyl acetate, butyl acetate, toluene, xylene, methylethylketone, acetone, and acetonitrile. Ethyl acetate, acetone, or acetonitrile is preferably used because such a halogen-free organic solvent has good solubility with a PHBH and has a high drying speed. The above organic solvents may be used alone or in combination of two or more.

(Biodegradable Polyester Solution)

In the present specification, the term "biodegradable polyester solution" refers to a solution containing polyester that can be decomposed by a microorganism in soil and/or in seawater. The present biodegradable polyester solution contains at least a PHBH as biodegradable polyester.

In an embodiment of the present invention, the PHBH contained in the present biodegradable polyester solution has a solid content concentration of, for example, 0.1% by weight to 75% by weight, preferably 0.25% by weight to 73% by weight, and more preferably 0.5% by weight to 70% by weight. The PHBH that has a solid content concentration in a range of 0.1% by weight to 75% by weight brings about an effect of allowing the present biodegradable polyester solution to have a suitable viscosity for processing. Note that the solid content concentration of the PHBH contained in the present biodegradable polyester solution is measured by a method described in Examples.

In an embodiment of the present invention, the present biodegradable polyester solution may contain one or more kinds of biodegradability resins other than the PHBH provided that the present biodegradable polyester solution brings about an effect of the present invention. Examples of such other resins include aliphatic polyester-based resins such as polybutylene succinate, polycaprolactone, and polylactic acid, and aliphatic aromatic polyester-based resins such as polybutylene adipate terephthalate, polybutylene sebacate terephthalate, and polybutylene azelate terephthalate. Such a resin(s) is/are added in an amount of preferably 30 parts by weight or less so that the present biodegradable polyester solution is biodegradable.

In an embodiment of the present invention, the present biodegradable polyester solution may contain an additive that is ordinarily used in the technical field to which the present invention pertains, provided that the present biodegradable polyester solution brings about the effect of the present invention. Examples of such an additive include inorganic fillers such as talc, calcium carbonate, mica, silica, titanium oxide, and alumina, organic fillers such as rice husks, wood flour, wastepaper such as newspaper, various starches, and cellulose, coloring agents such as a pigment and a colorant, odor absorbing agents such as active carbon and zeolite, perfumes such as vanillin and dextrin, plasticizing agents, oxidation inhibitors, antioxidants, weatherability improvers, ultraviolet absorbers, crystal nucleating agents, lubricants, mold releasing agents, water repellent agents, antibacterial agents, slidability improving agents, tackifiers, fillers, and agents. The present biodegradable polyester solution may contain only one or two or more of the above additives. Furthermore, a solid content concentration of an additive(s) can be set as appropriate by a person skilled in the art in accordance with intended use of the additive(s).

[2. Application]

As described earlier, the present biodegradable polyester solution exhibits good solubility in a halogen-free organic solvent and has sufficient adhesion strength even when aged for a short time. This allows the present biodegradable polyester solution to be applied to various applications. Such applications are exemplified by, but not particularly limited to, an adhesive, a tackiness agent, ink, a coating agent, a binder, and a sustained release processing agent. The following description will specifically discuss an adhesive and ink as typical examples.

(Biodegradable Adhesive)

In an embodiment of the present invention, provided is a biodegradable adhesive containing the present biodegradable polyester solution (hereinafter referred to as "the present biodegradable adhesive"). The present biodegradable adhesive contains a biodegradable polyester solution that exhibits good solubility in a halogen-free organic solvent and that has sufficient adhesive strength even when aged for a short time. Thus, in terms of a working environment, the present biodegradable adhesive causes few problems to human health and is more useful than a conventional adhesive.

The PHBH contained in the present biodegradable adhesive has a solid content concentration that is exemplified by, but not particularly limited to, 25% by weight to 75% by weight, preferably 28% by weight to 73% by weight, and more preferably 30% by weight to 70% by weight. The PHBH that has a solid content concentration in a range of 25% by weight to 75% by weight brings about an effect of allowing the present biodegradable adhesive to have a suitable viscosity during application as an adhesive.

In an embodiment of the present invention, the present biodegradable adhesive may contain various substances that may be added to an ordinary adhesive, provided that the present biodegradable adhesive does not lose its biodegradability. Examples of such additives include a coloring agent, a filler, a plasticizer, a bulking agent, and a resin. The present biodegradable adhesive may contain only one or two or more of the above additives. Furthermore, a solid content concentration of an additive(s) can be set as appropriate by a person skilled in the art in accordance with intended use of the additive(s).

The present biodegradable adhesive has an adhesion strength, as measured by a method described in Examples, of, for example, 0.1 N/15 mm or more, and preferably 1 N/15 mm or more. The present biodegradable adhesive that has an adhesion strength of 0.1 N/15 mm or more brings about an effect of having a practical strength as an adhesive and/or a tackiness agent. The adhesion strength of the present biodegradable adhesive has an upper limit that is exemplified by, but not particularly limited to, 10 N/15 mm or less.

(Biodegradable Ink)

In an embodiment of the present invention, provided is biodegradable ink containing: the present biodegradable polyester solution; and a pigment and/or a colorant (hereinafter referred to as "the present biodegradable ink"). The present biodegradable ink contains a biodegradable polyester solution that exhibits good solubility in a halogen-free organic solvent and that has sufficient adhesive strength even when aged for a short time. Thus, in terms of a working environment, the present biodegradable ink causes few problems to human health and is more useful than conventional ink.

The PHBH contained in the present biodegradable ink has a solid content concentration that is exemplified by, but not particularly limited to, 0.1% by weight to 20% by weight, preferably 0.2% by weight to 18% by weight, and more preferably 0.5% by weight to 15% by weight. The PHBH that has a solid content concentration in a range of 0.1% by weight to 20% by weight brings about an effect of allowing the present biodegradable ink to have a suitable viscosity during application as ink.

The pigment contained in the present biodegradable ink is exemplified by, but not particularly limited to, titanium oxide, calcium carbonate, barium sulfate, yellow iron oxide, carbon black, aluminum powder, mica, and titanium powder. One of these pigments can be used alone, or two or more of these pigments can be used.

The pigment and/or the colorant that is/are contained in the present biodegradable ink has a solid content concentration (% by weight of the pigment/the colorant relative to a sum of a pigment/colorant weight and a solvent weight) that is exemplified by, but not particularly limited to, 0.1% by weight to 20% by weight, preferably 0.2% by weight to 15% by weight, and more preferably 0.3% by weight to 10% by weight. The pigment and/or the colorant that has/have a solid content concentration of 0.1% by weight or more bring(s) about a good coloring effect. The pigment and/or the colorant that has/have a solid content concentration of 20% by weight or less bring(s) about an effect of allowing the present biodegradable ink to have a suitable viscosity during application.

In an embodiment of the present invention, the present biodegradable ink may contain, other than the pigment and/or the colorant, various substances that may be added to ordinary ink, provided that the present biodegradable ink does not lose its biodegradability. Examples of such additives include a dispersion agent, a surfactant, an anti-abrasion agent, an antifungal agent, a preservative, an antioxidant, a thickening stabilizer, and a brightener. The present biodegradable ink may contain only one or two or more of the above additives. Furthermore, a solid content concentration of an additive(s) can be set as appropriate by a person skilled in the art in accordance with intended use of the additive(s).

[3. Biodegradable Laminate]

In an embodiment of the present invention, provided is a biodegradable laminate including: a biodegradable base material; and a resin layer provided on at least one side of the biodegradable base material, the resin layer having been formed by applying the present biodegradable polyester solution to the biodegradable base material (hereinafter referred to as "the present biodegradable laminate"). Application of a biodegradable polyester solution to a biodegradable base material allows the present biodegradable laminate to easily impart, to the biodegradable base material, a characteristic (e.g., adhesiveness) of a resin contained in the biodegradable polyester solution.

The biodegradable base material is not particularly limited provided that the biodegradable base material has biodegradability and shape retainability. Examples of the biodegradable base material include paper (containing cellulose as a main component), cellophane, and cellulose ester; and polyvinyl alcohol, polyamino acid, polyglycolic acid, pullulan, biodegradable polyester, and inorganic matters such as aluminum and silica vapor-deposited on these base materials. Among the above biodegradable base materials, paper or biodegradable polyester is preferable due to its excellence in heat resistance and in biodegradability. A type of paper is exemplified by, but not particularly limited to, cup base paper, machine glazed paper, kraft paper, fine paper, coated paper, thin paper, glassine paper, and a paperboard.

Examples of biodegradable polyester include aliphatic polyester resins such as polybutylene succinate (PBS)-based resins, polycaprolactone (PCL)-based resins, and polyhydroxyalkanoate-based resins, and aliphatic aromatic polyester resins such as polybutylene adipate terephthalate (PBAT)-based resins, polybutylene sebacate terephthalate-based resins, and polybutylene succinate terephthalate-based resins.

A type of the biodegradable base material can be selected as appropriate in accordance with an application of the present laminate. If necessary, a water-resisting agent, a water repellent agent, an inorganic matter, and/or the like may be added to the biodegradable base material. The biodegradable base material may be subjected to a surface treatment such as oxygen barrier layer coating or water vapor barrier coating.

The present biodegradable laminate can be produced by, for example, applying the present biodegradable polyester solution to one side or both sides of the biodegradable base material and further carrying out drying if necessary. Such a method can be carried out by a known method as appropriate, and is not particularly limited.

[4. Method for Producing Laminate]

In an embodiment of the present invention, provided is a method for producing a biodegradable laminate including a biodegradable base material and a resin layer, including an application step of applying the present biodegradable polyester solution to at least one side of the biodegradable base material so as to form the resin layer (hereinafter referred to as "a method for producing the present laminate"). The method for producing the present laminate can further include a drying step of drying the applied biodegradable polyester solution.

In an embodiment of the present invention, the method for producing the present laminate may include the following steps: (a) a step of producing the present biodegradable polyester solution; (b) a step of feeding the biodegradable base material; (c) an application step of applying the biodegradable polyester solution to the biodegradable base material; and (d) a drying step of drying the applied biodegradable polyester solution. Furthermore, the method for producing the present laminate can include, instead of the (c) application step, an immersion step of immersing the biodegradable base material in the present biodegradable polyester solution so that the present biodegradable polyester solution adheres to a surface of the biodegradable base material. A method for carrying out the steps of the method for producing the present laminate can be carried out by a known method as appropriate, and is not particularly limited.

The present invention is not limited to the embodiments, but can be altered by a skilled person in the art within the scope of the claims. The present invention also encompasses, in its technical scope, any embodiment derived by combining technical means disclosed in differing embodiments.

In other words, an embodiment of the present invention is as follows.

<1> A biodegradable polyester solution containing:
    a poly(3-hydroxybutyrate-co-3-hydroxyhexanoate) copolymer; and
    an organic solvent,
    the poly(3-hydroxybutyrate-co-3-hydroxyhexanoate) copolymer having an average content of 16 mol % or more 3-hydroxyhexanoate.

<2> The biodegradable polyester solution recited in <1>, wherein the organic solvent is a halogen-free organic solvent.

<3> The biodegradable polyester solution recited in <1> or <2>, wherein the poly(3-hydroxybutyrate-co-3-hydroxyhexanoate) copolymer contained in the biodegradable polyester solution has a solid content concentration of 0.1% by weight to 75% by weight.

<4> The biodegradable polyester solution as set forth in any one of <1> to <3,> wherein the poly(3-hydroxybutyrate-co hydroxyhexanoate) copolymer has a weight average molecular weight of 100,000 g/mol to 3,000,000 g/mol.

<5> A biodegradable adhesive containing a biodegradable polyester solution recited in any one of <1> to <4>.

<6> Biodegradable ink containing: a biodegradable polyester solution recited in any one of <1> to <4>; and a pigment and/or a colorant.

<7> A biodegradable laminate including:
    a biodegradable base material; and
    a resin layer provided on at least one side of the biodegradable base material,
    the resin layer having been formed by applying a biodegradable polyester solution recited in any one of <1> to <4> to the biodegradable base material.

<8> The biodegradable laminate recited in <7>, wherein the biodegradable base material is paper or biodegradable polyester.

<9> A method for producing a biodegradable laminate including a biodegradable base material and a resin layer, including an application step of applying a biodegradable polyester solution recited in any one of <1> to <4> to at least one side of the biodegradable base material so as to form the resin layer.

<10> The method recited in <9>, wherein the biodegradable base material is paper or biodegradable polyester.

EXAMPLES

The following description will discuss embodiments of the present invention in further detail on the basis of Examples. Note, however, that the present invention is not limited to the Examples.

[Raw Material Resin]

PHBH 1: having an average content (3 HB/3 HH) of 83/17 (mol %/mol %) and a weight average molecular weight of 400,000 g/mol, produced in accordance with the method disclosed in Example 7 of WO2019/142845

PHBH 2: having an average content (3 HB/3 HH) of 76/24 (mol %/mol %) and a weight average molecular weight of 560,000 g/mol, produced in accordance with the method disclosed in Example 6 of WO2019/142845

PHBH 3: having an average content (3 HB/3 HH) of 72/28 (mol %/mol %) and a weight average molecular weight of 610,000 g/mol, produced in accordance with the method disclosed in Example 9 of WO2019/142845

PHBH 4: having an average content (3 HB/3 HH) of 72/28 (mol %/mol %) and a weight average molecular weight of 2,020,000 g/mol, produced in accordance with the method disclosed in Example 9 of WO2019/142845

PHBH 5: having an average content (3 HB/3 HH) of 72/28 (mol %/mol %) and a weight average molecular weight of 100,000 g/mol, produced in accordance with the method disclosed in Example 9 of WO2019/142845

PHBH 6: having an average content (3 HB/3 HH) of 85/15 (mol %/mol %) and a weight average molecular weight of 80,000 g/mol, produced in accordance with the method disclosed in Example 4 of WO2019/142845

X131A: Kaneka Biodegradable Polymer PHBH (registered trademark) X131A [poly(3-hydroxybutyrate-co-3-hydroxyhexanoate)] manufactured by KANEKA CORPORATION 151C: Kaneka Biodegradable Polymer PHBH (registered trademark) 151C. [poly(3-hydroxybutyrate-co-3-hydroxyhexanoate)] manufactured by KANEKA CORPORATION

[Measurement and Evaluation Methods]

In Examples and Comparative Examples, evaluation was carried out by the following method.

(Average Content of 3 HH)

To 20 mg of a dried poly(3-hydroxybutyrate-co-3-hydroxyhexanoate) copolymer, 2 mL of a mixed solution of sulfuric acid and methanol (volume ratio: 15:85) and 2 mL of chloroform were added, a resultant mixture was hermetically sealed and heated at 100° C. for 140 minutes. This resulted in preparation of methyl ester, which is a decomposition product of the poly(3-hydroxybutyrate-co-3-hydroxyhexanoate) copolymer. After the methyl ester was cooled, 1.5 g of sodium hydrogencarbonate was added thereto little by little so that a resultant mixture was neutralized, and the mixture was left to stand until generation of carbon dioxide gas was stopped. After 4 mL of diisopropyl ether was added and a resultant mixture was sufficiently mixed, centrifugation was carried out so that a monomer unit composition of decomposed polyester in a supernatant was analyzed by capillary gas chromatography.

(Solid Content Concentration)

A solid content concentration was calculated by the following equation:

$$\text{Solid content concentration (\%)} = \text{resin weight}(g) / (\text{resin weight}(g) + \text{solvent weight}(g)) \times 100$$

(Weight Average Molecular Weight)

Note that a weight average molecular weight was determined as a polystyrene equivalent molecular weight by gel permeation chromatography (GPC) ("Shodex GPC-101" manufactured by Showa Denko K.K.) by using polystyrene gel ("Shodex K-804" manufactured by Showa Denko K.K.) in a column and assuming that chloroform is a mobile phase.

(Dissolved State)

A resin raw material was dissolved in a solvent. A resultant mixture was heated in an oven at 60'C for 6 hours, and then a dissolved state was observed. A degree of opacity of the mixture was visually observed and evaluated.

<Evaluation>

VG: Very good

G: Good

P: Insoluble (Adhesion Strength)

A biodegradable polyester solution was unbleached and applied to kraft paper (mass per unit area: 150 g/m²) with use of a 4 mil applicator so that a coating layer (resin layer) was formed. Then, the coating layer was sandwiched by sheets of the kraft paper, and the sheets were bonded together with use of a roller weighing 2 kg. Thereafter, the bonded sheets that had been heated and dried in an oven at 60° C. for 1 hour were used as a sample.

In accordance with the method of JIS Z 0238, the sample was cut into a piece having a width of 15 mm, and a peel strength test was carried out. The peel strength test was carried out under a condition that a distance between chucks was 100 mm and a tensile speed was 300 mm/min. A peel tester used was Shimadzu Autograph EZ-LX (manufactured by Shimadzu Corporation).

(Ink Evaluation)

Ink characteristics were evaluated by pressing, with a finger, a part of the dried sample in which part biodegradable ink had been dropped.

<Evaluation>

G: Good (ink is fixed on paper without being transferred to the finger side)

P: Unsuitable (ink is transferred to the finger side)

Example 1

(Preparation of Adhesive)

The PHBH 1 was used as a resin raw material, and ethyl acetate was added as a solvent, so that a mixture having a solid content concentration of 30% by weight was prepared. Then, the mixture was heated in an oven at 60° C. for 6 hours so that a biodegradable polyester solution adhesive was produced. A state of the biodegradable polyester solution adhesive thus produced was visually observed so that a dissolved state of the PHBH was evaluated.

The produced solution was unbleached and applied to kraft paper (mass per unit area: 150 g/m²) with use of a 4 mil applicator so that a coating layer (resin layer) was formed. Then, the coating layer was sandwiched by sheets of the kraft paper, and the sheets were bonded together with use of a roller weighing 2 kg. Thereafter, the bonded sheets that had been heated and dried in an oven at 60° C. for 1 hour were used as a sample so that adhesion strength was evaluated. Table 1 shows results of the evaluation of the dissolved state of the PHBH and the adhesion strength.

(Preparation of Ink)

The PHBH 1 was used as a resin raw material, and ethyl acetate was added as a solvent, so that a mixture having a solid content concentration of 10% by weight was prepared. Then, 2 parts of titanium oxide powder was added as a pigment. Thereafter, a resultant mixture was heated in an oven at 60° C. for 6 hours, and the pigment was dispersed with use of a homogenizer so that biodegradable ink was produced.

A syringe was used to drop a 1 ml ink solution onto black paper, and the paper that had been dried at 60° C. for 1 hour was used as a sample so that ink characteristics were evaluated.

Example 2

Example 2 evaluated the dissolved state of the PHBH, the adhesion strength, and the ink characteristics as in the case of Example 1 except that Example 2 changed the raw material to the PHBH 2. Table 1 shows results of the evaluation.

Example 3

Example 3 evaluated the dissolved state of the PHBH, the adhesion strength, and the ink characteristics as in the case of Example 1 except that Example 3 changed the raw material to the PHBH 3. Table 1 shows results of the evaluation.

Example 4

Example 4 evaluated the dissolved state of the PPHBH, the adhesion strength, and the ink characteristics as in the case of Example 1 except that Example 4 changed the raw material to the PHBH 4. Table 1 shows results of the evaluation.

Example 5

Example 5 evaluated the dissolved state of the PHBH, the adhesion strength, and the ink characteristics as in the case of Example 1 except that Example 5 changed the raw material to the PHBH 5. Table 1 shows results of the evaluation.

Example 6

Example 6 evaluated the dissolved state of the PHBH, the adhesion strength, and the ink characteristics as in the case of Example 1 except that Example 6 changed the raw material to the PHBH 3 and changed the solid content concentration to 50% by weight. Table 1 shows results of the evaluation.

Example 7

Example 7 evaluated the dissolved state of the PHBH, the adhesion strength, and the ink characteristics as in the case of Example 1 except that Example 7 changed the raw material to the PHBH 3 and changed the solid content concentration to 70% by weight. Table 1 shows results of the evaluation.

Example 8

Example 8 evaluated the dissolved state of the PHBH, the adhesion strength, and the ink characteristics as in the case of Example 1 except that Example 8 changed the raw material to the PHBH 3 and changed the solvent to acetone. Table 1 shows results of the evaluation.

Example 9

Example 9 evaluated the dissolved state of the PHBH, the adhesion strength, and the ink characteristics as in the case of Example 1 except that Example 9 changed the raw material to the PHBH 3 and changed the solvent to acetonitrile. Table 1 shows results of the evaluation.

Comparative Example 1

Comparative Example 1 evaluated the dissolved state of the PHBH as in the case of Example 1 except that Comparative Example 1 changed the raw material to the X131A. Table 1 shows results of the evaluation.

Comparative Example 2

Comparative Example 2 evaluated the dissolved state of the PHBH as in the case of Example 1 except that Comparative Example 2 changed the raw material to the 151 C. Table 1 shows results of the evaluation.

Comparative Example 3

Comparative Example 3 evaluated the dissolved state of the PHBH as in the case of Example 1 except that Comparative Example 3 changed the raw material to the PHBH 6. Table 1 shows results of the evaluation.

Comparative Example 4

Comparative Example 4 evaluated the dissolved state of the PHBH as in the case of Example 1 except that Comparative Example 4 changed the raw material to the 151C and changed the solvent to acetone. Table 1 shows results of the evaluation.

Comparative Example 5

Comparative Example 5 evaluated the dissolved state of the PHBH as in the case of Example 1 except that Comparative Example 5 changed the raw material to the 151C and changed the solvent to acetonitrile. Table 1 shows results of the evaluation.

TABLE 1

| | Raw material resin | Average content of 3HH (mol %) | Solvent | Solid content concentration (% by weight) | Weight average molecular weight (g/mol) | Dissolved state | Adhesion strength (N/15 mm) | Ink evaluation |
|---|---|---|---|---|---|---|---|---|
| Example 1 | PHBH 1 | 17 | Ethyl acetate | 30 | 400,000 | G | 3.1 | G |
| Example 2 | PHBH 2 | 24 | Ethyl acetate | 30 | 560,000 | VG | 5.3 | G |
| Example 3 | PHBH 3 | 28 | Ethyl acetate | 30 | 610,000 | VG | 5.2 | G |
| Example 4 | PHBH 4 | 28 | Ethyl acetate | 30 | 2,020,000 | VG | 7.1 | G |
| Example 5 | PHBH 5 | 28 | Ethyl acetate | 30 | 100,000 | VG | 2.1 | G |
| Example 6 | PHBH 3 | 28 | Ethyl acetate | 50 | 610,000 | VG | 5.5 | G |
| Example 7 | PHBH 3 | 28 | Ethyl acetate | 70 | 610,000 | VG | 6.0 | G |
| Example 8 | PHBH 3 | 28 | Acetone | 30 | 610,000 | VG | 4.6 | G |
| Example 9 | PHBH 3 | 28 | Acetonitrile | 30 | 610,000 | VG | 4.2 | G |
| Comparative Example 1 | X131A | 6 | Ethyl acetate | 30 | 580,000 | P | — | — |
| Comparative Example 2 | 151C | 11 | Ethyl acetate | 30 | 610,000 | P | — | — |
| Comparative Example 3 | PHBH 6 | 15 | Ethyl acetate | 30 | 80,000 | P | — | — |
| Comparative Example 4 | 151C | 11 | Acetone | 30 | 610,000 | P | — | — |
| Comparative Example 5 | 151C | 11 | Acetonitrile | 30 | 610,000 | P | — | — |

[Results]

Table 1 shows that the dissolved state of the PHBH in a halogen-free organic solvent is better in Examples than in Comparative Examples. It is also shown that the biodegradable adhesives produced in Examples and each containing the biodegradable polyester solution have excellent adhesion strength. Furthermore, it is shown that the biodegradable ink produced in Examples and containing the biodegradable polyester solution has good ink characteristics.

It has been found from the above that the present biodegradable polyester solution exhibits good solubility in a halogen-free organic solvent and has sufficient adhesion strength even when aged for a short time.

INDUSTRIAL APPLICABILITY

A biodegradable polyester solution of the present invention can be suitably used in various fields including fields of, for example, paints, adhesive agents, ink, fiber processing, sheet and film processing, and paper processing.

The invention claimed is:

1. A biodegradable polyester solution, comprising:
a poly(3-hydroxybutyrate-co-3-hydroxyhexanoate) copolymer; and
an organic solvent,
wherein the poly(3-hydroxybutyrate-co-3-hydroxyhexanoate) copolymer has an average content of 3-hydroxyhexanoate of at least 16 mol %,
wherein the organic solvent is a halogen-free organic solvent, and
wherein the biodegradable laminate is free from a halogen-based organic solvent.

2. The biodegradable polyester solution of claim 1, wherein a solid content concentration of the poly(3-hydroxy butyrate-co-3-hydroxyhexanoate) copolymer in the biodegradable polyester solution is from 0.1% by weight to 75% by weight.

3. The biodegradable polyester solution of claim 1, wherein the poly(3-hydroxybutyrate-co-3-hydroxyhexanoate) copolymer has a weight average molecular weight of from 100,000 g/mol to 3,000,000 g/mol.

4. The biodegradable polyester solution of claim 3, wherein the poly(3-hydroxybutyrate-co-3-hydroxyhexanoate) copolymer has the average content of 3-hydroxyhexanoate of at least 20 mol %.

5. The biodegradable polyester solution of claim 1, wherein the poly(3-hydroxybutyrate-co-3-hydroxyhexanoate) copolymer has the average content of 3-hydroxyhexanoate of at least 20 mol %.

6. The biodegradable polyester solution of claim 1, wherein the poly(3-hydroxybutyrate-co-3-hydroxyhexanoate) copolymer has the average content of 3-hydroxyhexanoate of from 22 mol % to 80 mol %.

7. The biodegradable polyester solution of claim 1, wherein the poly(3-hydroxybutyrate-co-3-hydroxyhexanoate) copolymer has the average content of 3-hydroxyhexanoate of from 22 mol % to 50 mol %.

8. The biodegradable polyester solution of claim 1, wherein the organic solvent is at least one selected from the group consisting of ethyl acetate, butyl acetate, toluene, xylene, methylethylketone, acetone, and acetonitrile.

9. The biodegradable polyester solution of claim 1, wherein a solid content concentration of the poly(3-hydroxybutyrate-co-3-hydroxyhexanoate) copolymer in the biodegradable polyester solution is from 0.5% by weight to 70% by weight.

10. The biodegradable polyester solution of claim 1, wherein the poly(3-hydroxybutyrate-co-3-hydroxyhexanoate) copolymer has a weight average molecular weight of from 300,000 g/mol to 2,100,000 g/mol.

11. The biodegradable polyester solution of claim 1, further comprising:
a biodegradable resin other than the poly(3-hydroxybutyrate-co-3-hydroxyhexanoate) copolymer.

12. A biodegradable adhesive, comprising:
the biodegradable polyester solution of claim 1.

13. The biodegradable adhesive of claim 12, wherein a solid content concentration of the poly(3-hydroxybutyrate-co-3-hydroxyhexanoate) copolymer in the biodegradable adhesive is from 25% by weight to 75% by weight.

14. Biodegradable ink, comprising:
A biodegradable polyester solution of claim 1; and
a pigment and/or a colorant.

15. A biodegradable laminate, comprising:

a biodegradable base material; and a resin layer provided on at least one side of the biodegradable base material, wherein the resin layer is formed by applying the biodegradable polyester solution of claim 1 to the biodegradable base material.

16. The biodegradable laminate of claim 15, wherein the biodegradable base material is paper or biodegradable polyester.

17. A method for producing a biodegradable laminate comprising a biodegradable base material and a resin layer, the method comprising:

applying the biodegradable polyester solution of claim 1 to at least one side of the biodegradable base material so as to form the resin layer.

18. The method of claim 17, wherein the biodegradable base material is paper or biodegradable polyester.

19. A biodegradable polyester solution comprising:

a poly(3-hydroxybutyrate-co-3-hydroxyhexanoate) copolymer; and an organic solvent, wherein the poly(3-hydroxybutyrate-co-3-hydroxyhexanoate) copolymer has an average content of 3-hydroxyhexanoate of at least 16 mol %, wherein the organic solvent is a halogen-free organic solvent, wherein the organic solvent is at least one selected from the group consisting of ethyl acetate, butyl acetate, toluene, xylene, methylethylketone, acetone, and acetonitrile.

20. A biodegradable adhesive, comprising:

the biodegradable polyester solution of claim 19.

* * * * *